(12) United States Patent
Locklar et al.

(10) Patent No.: US 9,089,119 B1
(45) Date of Patent: Jul. 28, 2015

(54) SOLAR POWERED FISHING BOBBER APPARATUS

(71) Applicant: Sola Group, LLC, Hendersonville, TN (US)

(72) Inventors: Kevin Locklar, Hendersonville, TN (US); Scott Roe, Hendersonville, TN (US); Fran Romeo, Old Hickory, TN (US)

(*) Notice: Subject to any disclaimer, the term of this patent is extended or adjusted under 35 U.S.C. 154(b) by 161 days.

(21) Appl. No.: 13/965,502

(22) Filed: Aug. 13, 2013

Related U.S. Application Data

(60) Provisional application No. 61/682,424, filed on Aug. 13, 2012.

(51) Int. Cl.
*A01K 79/02* (2006.01)
*A01K 93/02* (2006.01)
*H05B 37/02* (2006.01)

(52) U.S. Cl.
CPC ............. *A01K 93/02* (2013.01); *H05B 37/02* (2013.01)

(58) Field of Classification Search
USPC ...................................................... 43/4–144
See application file for complete search history.

(56) References Cited

U.S. PATENT DOCUMENTS

| | | | |
|---|---|---|---|
| 3,693,278 A * | 9/1972 | Mahone, Jr. ............. | 43/17.5 |
| 4,070,784 A | 1/1978 | Yokogawa et al. | |
| 4,625,447 A * | 12/1986 | Buchanan ............... | 43/17.1 |
| 4,809,458 A * | 3/1989 | Tanikuro et al. ........ | 43/17.5 |
| 5,066,338 A | 11/1991 | Meyers | |
| 5,111,609 A | 5/1992 | Flo | |
| 5,175,950 A | 1/1993 | Linder | |
| 5,362,267 A | 11/1994 | Forrest | |
| 6,029,388 A | 2/2000 | Yokogawa et al. | |
| 6,796,077 B1 | 9/2004 | Dupree et al. | |
| 2004/0200125 A1 * | 10/2004 | Albanito et al. ........ | 43/42.36 |
| 2004/0216355 A1 | 11/2004 | Gore | |
| 2007/0220798 A1 * | 9/2007 | Davidson ............... | 43/4 |
| 2007/0236921 A1 | 10/2007 | Mosholder, Jr. et al. | |
| 2010/0109556 A1 | 5/2010 | Mosholder, Jr. et al. | |

FOREIGN PATENT DOCUMENTS

JP          08214732          8/1996

\* cited by examiner

*Primary Examiner* — Brandon S Cole
(74) *Attorney, Agent, or Firm* — Patterson Intellectual Property Law, P.C.; Gary L. Montle

(57) ABSTRACT

A self-contained solar powered floating apparatus stores energy during the day and uses the stored energy to emit light underwater during the night, thereby attracting fish to the vicinity of the apparatus. The fishing bobber apparatus includes a floatable housing, a photovoltaic module disposed within the housing and including photovoltaic cells to receive solar radiation and convert the solar radiation into DC electricity. An energy storage module is electrically coupled to receive and store the DC electricity from the photovoltaic module during a storage mode, and a light emitting module is electrically coupled to receive DC electricity discharged from the energy storage module during a discharge mode and convert the DC electricity into light that is emitted through a portion of the housing. A light sensing module and associated control circuitry detects the presence of ambient light.

20 Claims, 2 Drawing Sheets

SOLAR POWERED FISHING BOBBER APPARATUS

CROSS-REFERENCES TO RELATED APPLICATIONS

This application claims benefit of the following patent application(s) which is/are hereby incorporated by reference: U.S. Patent Application Ser. No. 61/682,424, filed Aug. 13, 2012, for "Solar Powered Fishing Bobber Apparatus."

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

BACKGROUND OF THE INVENTION

The field of the invention is fishing gear and apparatuses. The present invention relates generally to a self-contained solar powered floating apparatus. More particularly, this invention relates to a self-contained solar-powered bobber effective to store energy during the day and further to use the stored energy to emit light underwater during the night, thereby attracting fish to the vicinity of the apparatus.

BRIEF SUMMARY OF THE INVENTION

In one embodiment, the bobber apparatus includes a floatable housing containing a photovoltaic module, an energy storage module, a light emitting module, and a light sensing module. The photovoltaic module may include one or more photovoltaic cells effective to receive solar radiation and to convert said solar radiation into direct current electricity. The energy storage module may be electrically coupled to the photovoltaic module to receive direct current electricity from the photovoltaic module. The light emitting module may be coupled to the energy storage module to receive direct current electricity discharged from the energy storage module and to emit light through a portion of the housing. The light sensing module may have control circuitry disposed within said housing effective to detect the presence of ambient light.

In another embodiment, the control circuitry may be effective in response to a first lighting output signal from the light sensing module to enable charging of the energy storage module and to disable light emission from the light emitting module. The control circuitry may also be effective in response to a second lighting output signal from the light sensing module to disable charging of the energy storage module and to enable light emission from the light emitting module.

In another embodiment, the bobber apparatus may also include an upper portion, a lower portion, and a central portion. The central portion may include a strip of visible material mounted to the exterior of the housing. The upper portion may be substantially translucent to allow for the reception of solar radiation. The upper and lower portions may be substantially translucent to allow for light to be emitted from the light emitter.

In another embodiment, the bobber apparatus may include a spring lock fishing line attachment attached to the exterior of the housing or a weight at the bottom of the housing to cause the bobber to float such that the cells of the photovoltaic module are faced in a particular direction.

In another embodiment, the bobber apparatus may include a waterproof switching element to enable a user to enable or disable the control circuitry. The bobber apparatus may include a remote-enabled switching element capable of receiving a signal to enable or disable the control circuitry from a remote location and for a plurality of bobber apparatuses.

Numerous objects, features and advantages of the present invention will be readily apparent to those skilled in the art upon a reading of the following disclosure when taken in conjunction with the accompanying drawings.

DETAILED DESCRIPTION OF THE INVENTION

Throughout this specification, the following terms take at least the meanings explicitly associated herein, unless the context dictates otherwise. The meanings identified below do not necessarily limit the terms, but merely provide illustrative examples for the terms. The meaning of "a," "an," and "the" may include plural references, and the meaning of "in" may include "in" and "on." The phrase "in one embodiment," as used herein does not necessarily refer to the same embodiment, although it may. The term "coupled" means at least either a direct electrical connection between the connected items or an indirect connection through one or more passive or active intermediary devices. Terms such as "providing," "processing," "supplying," "determining," "calculating" or the like may refer at least to an action of a computer system, computer program, signal processor, logic or alternative analog or digital electronic device that may be transformative of signals represented as physical quantities, whether automatically or manually initiated.

The terms "controller," "control circuit" and "control circuitry" may be used herein to refer to a general microprocessor, application specific integrated circuit (ASIC), microcontroller, or the like as may be designed and programmed to cause specific functions as further defined herein to be performed upon execution by a processing unit, either alone or in combination with a field programmable gate array or various alternative blocks of discrete circuitry as known in the art.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Referring generally to the attached Figures, an exemplary embodiment of a solar powered bobber according to the present invention may now be described.

Figure 1:
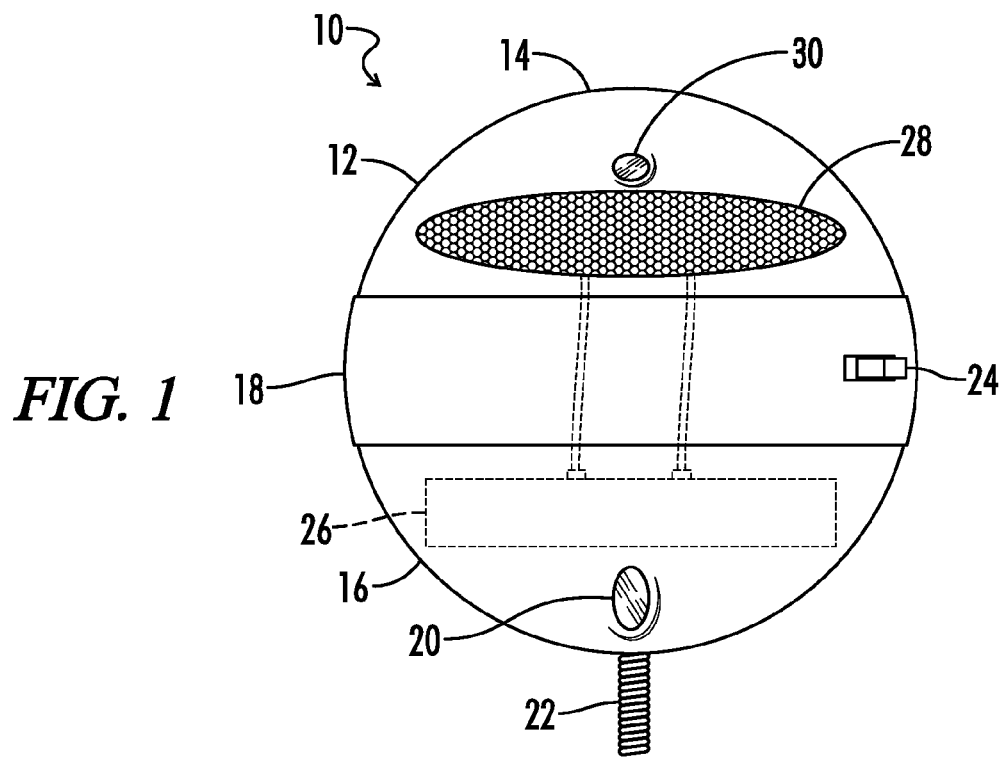
FIG. 1 shows a sectional view of a spherical shaped embodiment of the bobber apparatus.
Figure 2:
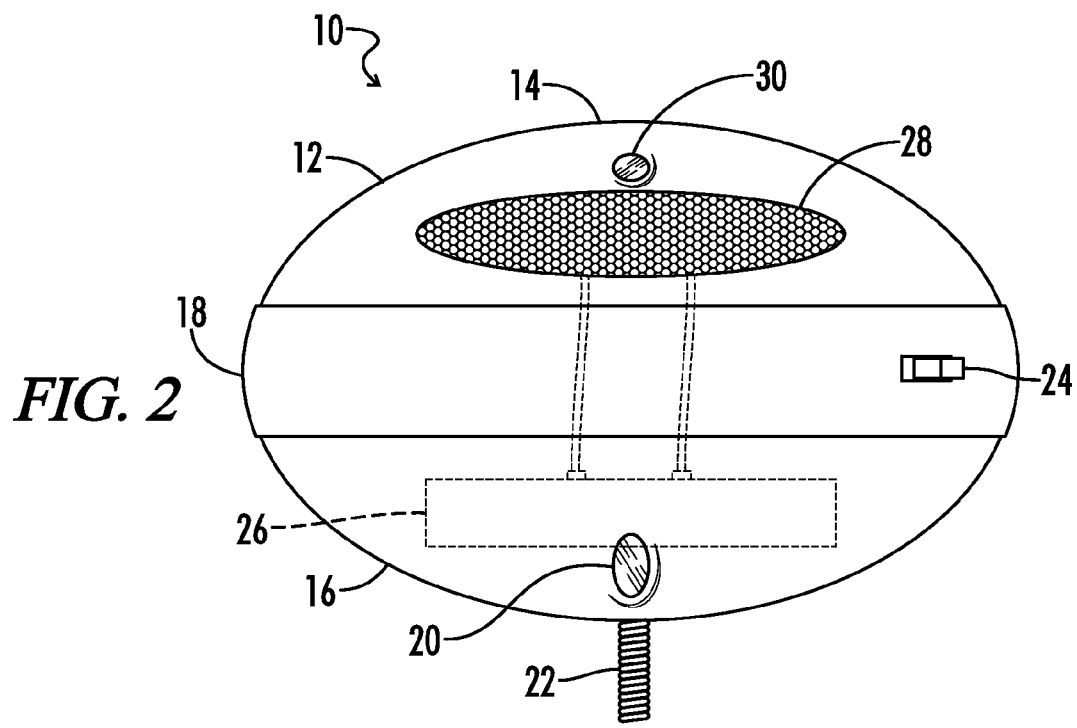
FIG. 2 depicts a sectional view of an elongated spherical shaped embodiment of the bobber apparatus.
Figure 3:
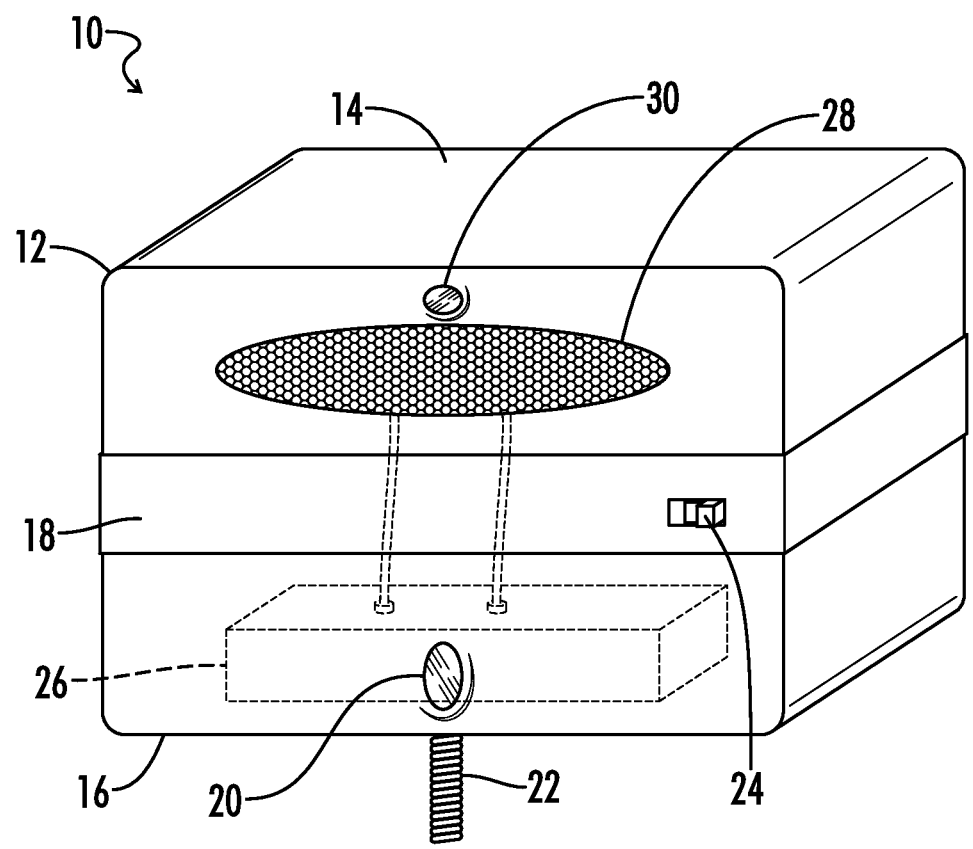
FIG. 3 illustrates a three-dimensional view of a box shaped embodiment of the bobber apparatus.

As shown in FIGS. 1-3, such a bobber 10 may typically include a housing 12 having any size and shape compatible with the additional components and features as described herein. In an embodiment as shown, the bobber housing 12 may have a first (upper) portion 14, a second (lower) portion 16, and a third (central) portion 18 running along the circumference of the housing 12. The second portion 16 is typically translucent about at least a portion of the associated surface to allow light to be emitted from a light emitter 20 residing within the bobber 10. The central portion 18 may be for example colored for improved visibility, and may be positioned along and/or slightly above a center-line of the bobber 10 so as to be visible above the water line when the bobber 10 is employed. The first portion 14 may typically be translucent about at least a portion of the associated surface to allow for the reception of solar radiation and further for increased visibility as described below.

An exterior of the bobber may in various embodiments further include or otherwise have disposed thereon a spring lock fishing line attachment 22 as otherwise configured in a manner known to those of skill in the art. A waterproof switching element 24 may be provided to enable a user to enable or disable the enclosed circuitry (described further below) according to the desired level of usage, for example to disable the battery charging and light emission circuitry when the bobber 10 is to be placed in storage and thereby preserve the life of the associated components.

An interior of the bobber further includes a solar photovoltaic module 28, an energy storage device 26 and a light emitter 20.

An exemplary solar photovoltaic module 28 according to the present invention may typically include one or more lenses or reflective surfaces and a solar cell or an array of solar cells positioned proximate the first (i.e., upper) portion of the housing to receive solar radiation and effective to convert the solar radiation into DC energy.

An exemplary energy storage device 26 according to the present invention is a nickel cadmium battery, but the bobber may in various embodiments include any solar battery and charger/charge controller as is conventionally known in the art for receiving and storing DC energy from a solar cell.

An exemplary light emitter 20 according to the present invention may typically include a UV LED bulb effective to receive energy from the energy storage device and to emit light through at least the second (lower) portion 16 of the housing 12. When the bobber 10 is employed in water, the emitted light will shine into the water and function as a fish attractant. In various embodiments the bobber 10 may be configured such that the light further is emitted through the upper portion 14 of the housing 12, so as to for example increase visibility of the bobber 10 to a user at night.

A small weighted component may be added to the lower portion 16 of the bobber 10, thereby ensuring that the bobber 10 is properly oriented while employed in the water, i.e., forcing the bobber to float with the solar cell facing upward and into the sun.

Where a waterproof switching element 24 is disposed about the exterior of the housing, the interior of the bobber housing includes an interior portion of the switching element 24, and further includes wiring to electrically couple the switching element to one or more associated components disposed therein. For example, the switching element in an "on" position may complete a circuit further including the photovoltaic cell and the battery to enable a charging operation which otherwise would be disabled.

In an embodiment, the waterproof switching element 24 having external and internal components with respect to the housing may be supplemented or alternatively replaced with a remote controllable switching element that may be wholly disposed within the housing. It may be understood that a single on/off control function remotely initiated by a user may be effective thereby to enable or disable charging circuits for a plurality of bobbers.

Various embodiments of the bobber 10 may include any or each of a light sensing module 30 and a lighting control circuit. The light sensing module 30 may be for example a conventional photo-sensor effective to determine when ambient light is available for charging the energy storage device 26. The light sensing module 30 and associated control circuitry may be configured to prevent the light emitter 20 from emitting light while the energy storage device 26 is being charged from the photovoltaic module (i.e., during the day), and to enable the light emitter 20 or otherwise direct the performance of the light emitter 20 by for example discharging the energy storage device 26 while it is no longer being charged (i.e., during the night).

In an embodiment as shown in FIGS. 1-3, only one photo sensor is included in the housing 12, so as to produce a substantially binary outcome based on the detected presence of sunlight, i.e., the light emitter being off during the day and on at night. Alternatively, more than one photo sensor may be disposed about the upper portion 14 of the housing in order to distinguish between various states of lighting during the day, and thereby to optimize the charging operation and the lighting operation, such as where for example there may not be enough daylight to efficiently charge the solar battery but yet too much ambient light to effectively attract fish via the emitted UV light.

Thus, although there have been described particular embodiments of the present invention of a new and useful Solar Powered Fishing Bobber Apparatus it is not intended that such references be construed as limitations upon the scope of this invention except as set forth in the following claims.

What is claimed is:

1. A fishing bobber apparatus comprising:
   a floatable housing;
   a photovoltaic module disposed within said housing and comprising one or more photovoltaic cells effective to receive solar radiation and to convert said solar radiation into direct current electricity;
   an energy storage module disposed within said housing and electrically coupled to receive said direct current electricity from said photovoltaic module;
   a light emitting module disposed within said housing and electrically coupled to receive direct current electricity discharged from said energy storage module, and effective to emit light through a portion of the housing; and
   a light sensing module having control circuitry disposed within said housing, and the light sensing module further effective to detect the presence of ambient light and to generate lighting output signals to the control circuitry representative of the ambient light.

2. The fishing bobber apparatus of claim 1, wherein:
   the control circuitry is effective in response to a first lighting output signal from the light sensing module to enable charging of the energy storage module and to disable light emission from the light emitting module, and
   the control circuitry is effective in response to a second lighting output signal from the light sensing module to disable charging of the energy storage module and to enable light emission from the light emitting module.

3. The fishing bobber apparatus of claim 2, wherein the housing defines an interior and an exterior, and the bobber apparatus further comprises upper, lower and central portions, wherein the upper portion is substantially translucent to allow for the reception of solar radiation.

4. The fishing bobber apparatus of claim 3, further comprising:
a circumference about the center of the housing, and a central portion mounted to the exterior of the housing, the central portion comprising a colored strip of plastic or metal-foil material mounted along the circumference of the housing.

5. The fishing bobber apparatus of claim 3, wherein:
the lower portion is substantially translucent to allow for light to be emitted from the light emitter.

6. The fishing bobber apparatus of claim 5, wherein the light emitting module is configured to emit light into both the upper portion and the lower portion of the housing.

7. The fishing bobber apparatus of claim 6, wherein a weighted component is added to the lower portion of the housing to cause an orientation of the bobber apparatus in a floating position wherein the one or more photovoltaic cells face toward the sun.

8. The fishing bobber apparatus of claim 3, further comprising:
a spring lock fishing line attachment attached to the exterior of the housing.

9. The fishing bobber apparatus of claim 1, further comprising:
a waterproof switching element mounted to the housing and effective to enable a user to selectably enable or disable the control circuitry.

10. The fishing bobber apparatus of claim 1, further comprising:
a remote-enabled switching element disposed within the housing and capable of receiving a signal to enable or disable the control circuitry from a remote location.

11. The fishing bobber apparatus of claim 1, wherein the energy storage module comprises a nickel cadmium battery.

12. The fishing bobber apparatus of claim 1, wherein the light emitting module comprises an ultraviolet light emitting diode bulb.

13. A fishing bobber apparatus comprising:
a housing defining an interior and an exterior and having first and second portions;
a photovoltaic module disposed within said interior and comprising one or more photovoltaic cells effective to receive solar radiation and to convert said solar radiation into DC energy;
an energy storage module disposed within said interior and electrically coupled to receive and store said DC energy from said photovoltaic module;
a light emitting module disposed within said interior and electrically coupled to receive DC energy discharged from said energy storage module, and effective to emit light through at least the second portion of said exterior; and
a light sensing module and associated control circuitry disposed within said interior, the light sensing module effective to receive ambient light via the first portion of the exterior and to generate lighting output signals representative of the received ambient light,
the control circuitry effective in response to a first lighting output signal from the light sensing module to enable charging of the energy storage module and to disable light emission from the light emitting module, and
the control circuitry effective in response to a second lighting output signal from the light sensing module to disable charging of the energy storage module and to enable light emission from the light emitting module.

14. The fishing bobber apparatus of claim 13, further comprising
a visible material fixed to the exterior of the bobber apparatus about the center of the bobbing apparatus.

15. The fishing bobber apparatus of claim 13, wherein:
the exterior of the housing is substantially translucent.

16. The fishing bobber apparatus of claim 13, wherein:
the light emitting module is configured to emit light into both the first and second portion of the housing.

17. The fishing bobber apparatus of claim 13, further comprising:
a waterproof switching element to enable a user to enable or disable the control circuitry.

18. The fishing bobber apparatus of claim 13, further comprising:
a remote-enabled switching element capable of receiving a signal to enable or disable the control circuitry from a remote location.

19. The fishing bobber apparatus of claim 13, further comprising:
a small weighted component to cause the bobber apparatus to float such that the one or more photovoltaic cells face toward the sun.

20. A method of controlling light output from a fishing bobber comprising a housing effective to float on water and having first and second translucent portions, the method comprising:
detecting the presence or absence of ambient light through the first portion of the housing;
in response to the detected presence of ambient light, generating one or more control signals enabling steps of
receiving solar radiation through the first portion of the housing;
converting the solar radiation into direct current (DC) energy; and
storing the DC energy within the housing;
in response to the detected absence of ambient light through the first portion of the housing, generating one or more control signals enabling steps of
discharging stored DC energy to a light-emitting module disposed within the housing; and
emitting light through at least the second portion of the housing.

* * * * *